M. W. & J. Zimmerman.
Pump.
No. 3,774. Reissued Dec. 21, 1869.
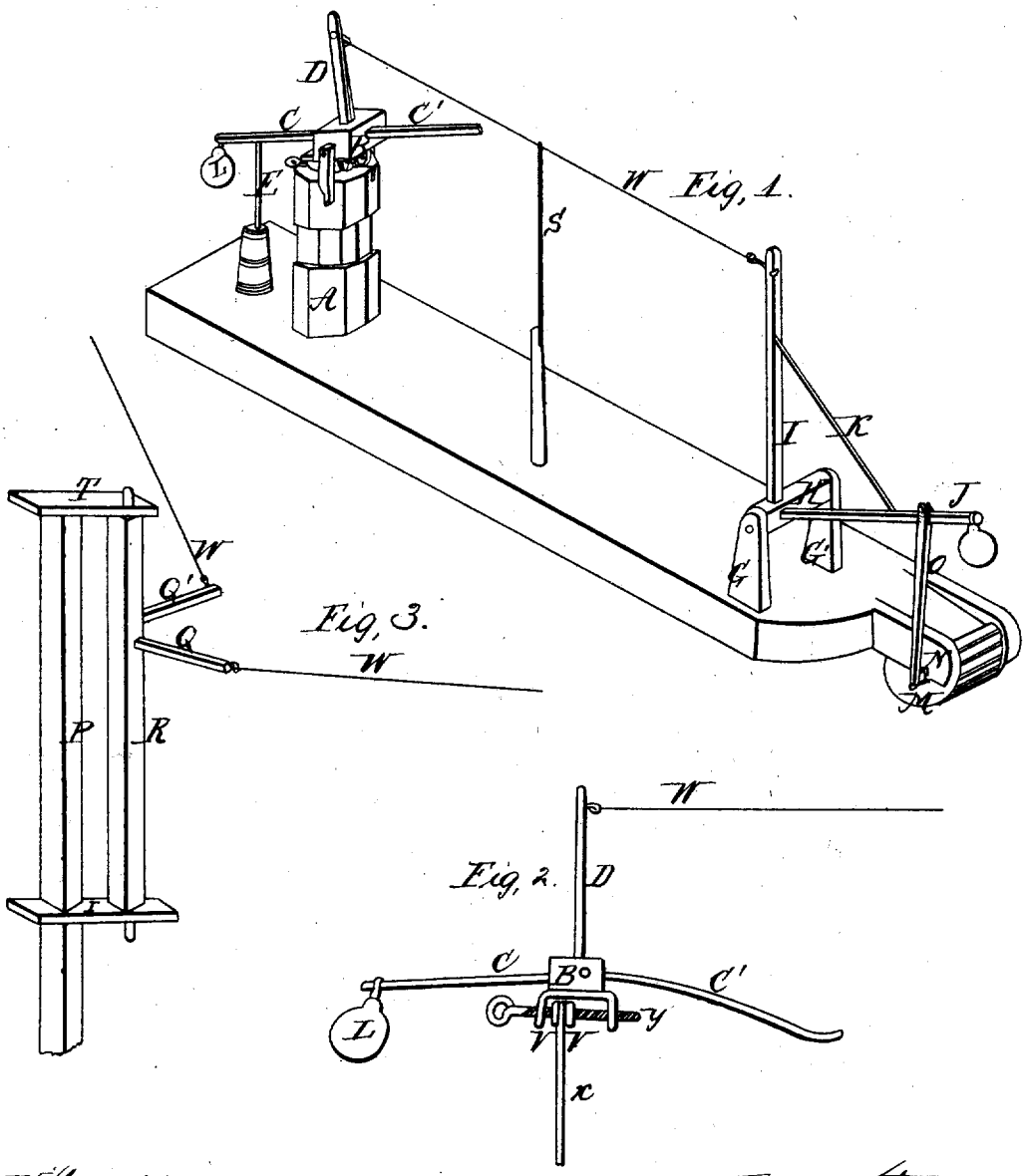
Witnesses,
William S Brown
E. G. Groff
Inventor,
Martin W. Zimmerman
John Zimmerman
N. PETERS, PHOTO-LITHOGRAPHER, WASHINGTON, D. C.

United States Patent Office.

HENRY R. SENSENIG AND MOSES W. MARTIN, OF EARL TOWNSHIP, PENNSYLVANIA, ASSIGNEES, BY MESNE ASSIGNMENTS, OF MARTIN W. ZIMMERMAN AND JOHN ZIMMERMAN.

*Letters Patent No.* 42,617, *dated May* 3, 1864; *reissue No.* 3,774, *dated December* 21, 1869.

IMPROVEMENT IN PUMPS.

The Schedule referred to in these Letters Patent and making part of the same.

*To all whom it may concern:*

Be it known that we, MARTIN W. ZIMMERMAN and JOHN ZIMMERMAN, of Earl township, in the county of Lancaster, and State of Pennsylvania, have invented an improved and simplified Mode for Operating Lifting-Pumps; and do hereby declare that the following is a full and exact description thereof, reference being had to the accompanying drawings, making a part of this specification, as originally made and signed by them.

The nature of the improvement consists in the employment of a single strand or wire, aided by a lever and counterpoise.

Figure 1 illustrates the arrangement of the rocker-shafts, arms, and single wire, operated by the crank on the water-wheel, at any distance from the pump, and any number of intermediate posts, F, and spring-poles, S, may be employed.

Figure 2 shows the piston or pump-rod X, between screw-burrs V V, on the screw Y, held beneath the rocking shaft B, for the purpose of regulating the stroke of the piston or pump-rod.

Figure 3 illustrates the mode for forming branch posts if desired.

The drawings clearly show the construction of said invention, and will enable others skilled in the art to make and use the same.

The common water-wheel M, with a crank, N, and connecting-rod O, is attached to the arm J, and operates the vibrating rocker-shaft H, with its perpendicular arm I, to which the wire W is secured.

This rocker-shaft H is held between two upright posts, G G′, or their equivalents.

There is also a brace, K, connecting the arms I J, shown.

The wire W is supported at intervals in a notch made in the top of a flexible lath, pole, or strip, S, of wood or iron, secured to the top of a post, F, any number of which may be employed, accordingly as the distance is more or less remote between the pump A and water-wheel M.

At any point on the line, a rocking shaft, fig. 3, may be set, for the purpose of starting out a diverging line to another pump, or adopting a different course in the line of the wire.

The arms Q Q are so placed, in relation to the vibrating upright R, secured in its bearings, as shown, in conformity with the desired angle of departure or object aimed to accomplish.

The rocker-block B, fig. 2, with its arm C C′, sits over the top of the pump A, held in side supports or bearings.

Beneath this block is the regulating-screw, Y, by which the stroke of the pump can be increased or diminished, in proportion as the piston X or pump-rod is brought nearer or is further removed from the pivot or centre of the fulcrum of the vibrating block B, thereby regulating the discharge of water at pleasure, or arresting its action entirely.

The projecting arms C′ may also be employed in like manner, as a common pump-handle.

To the opposite arms, C, a rod, E, may be attached, and employed in stamping or turning a crank. To this arm there is a weight or ball, L, which aids in the requisite motion.

When a pump is operated upon, as shown by fig. 1, a weight or counterpoise, L, is also applied to the arm J, connected with the crank N, by the rod O′.

This latter weight or counterpoise is not required on the arm J, when two pumps are operated, as it can then be applied to the projecting arm C′, of such other pump, as a counterpoise.

We are aware that the water-wheel and crank are not new, and that they are also employed for operating pumps in connection with two parallel lines of wire, either horizontally or vertically, applied to pivoted arms or cross-arms. Such we do not claim.

We save the expense of one-half the wire by using but a single line instead of two, by means of a counterpoise or weighted arm, to produce reaction.

What we claim as our invention, and desire to secure by Letters Patent, is—

1. The rocker-heads B H, with their arms D C I J, and counterpoise L, when operated in unison by a single wire, W, by means of a crank, N, and wheel M, substantially in the manner and for the purpose specified.

2. In combination with the foregoing arrangement, the adjusting-screw Y, with its burrs V V, when applied in the manner and for the purpose set forth.

MARTIN W. ZIMMERMAN.
JOHN ZIMMERMAN.
*Assignees of all the Right, Title, and Interest of Martin W. Zimmerman and John Zimmerman;*
HENRY R. SENSENIG.
MOSES W. MARTIN.

Witnesses:
REUBEN REIDENBACH,
JOHN M. STAUFFER.